Nov. 28, 1961    B. KELLEY    3,010,679

DEPHASED ACCELEROMETER

Filed March 4, 1957

INVENTOR.
BARTRAM KELLEY
BY
Beau, Brooks, Buckley + Beau.
ATTORNEYS

United States Patent Office 3,010,679
Patented Nov. 28, 1961

3,010,679
DEPHASED ACCELEROMETER
Bartram Kelley, Dallas, Tex., assignor, by mesne assignments, to Bell Aerospace Corporation, Wheatfield, N.Y., a corporation of Delaware
Filed Mar. 4, 1957, Ser. No. 643,619
6 Claims. (Cl. 244—17.13)

This invention relates to rotary wing aircraft, and more particularly to single lift rotor type helicopters and flight stabilization control means thereof, and relates generally to problems referred to in U.S. Patent 2,743,071.

It has been discovered that single rotor type helicopters, when being flown in forward flight with the pilot's "cyclic" control stick either locked or held inattentively by the pilot, sometimes tend to develop rolling oscillations, phugoidally, which send the aircraft into flight paths deviating spirally from the intended straight line flight path. This tendency is "triggered" by pitching deviations of the aircraft from the attitude norm, such as in response to disturbance forces originating either externally or internally of the aircraft, and the problem is peculiar to single lift rotor type helicopters, and does not occur in other type rotary wing or fixed wing aircraft. If such oscillations are not countered by skillful application of controls by the pilot, and this is difficult, they increase automatically in amplitude and violence, divergently from a stable flight attitude and soon result in a dangerously unstable flight condition.

It is an object of the present invention to provide in an aircraft as aforesaid an improved flight attitude automatic stabilization means, adapted to substantially anticipate and forestall the aforesaid tendencies to roll into a spiral flight path by sensing and responding to any unintended vertical or pitching accelerations of the aircraft.

It is another object of the invention to provide in a helicopter aircraft as aforesaid, means operating automatically to damp the aforementioned attitude deviation oscillations so as to cause the aircraft to return to the flight attitude norm subsequent to any disturbance therefrom without attention from the pilot, thereby giving the aircraft improved flight stability characteristics. Other objects and advantages of the invention will appear from the specification hereinafter illustrating and describing in detail an exemplification of the invention as shown in the accompanying drawing, wherein:

Figures 1, 2:
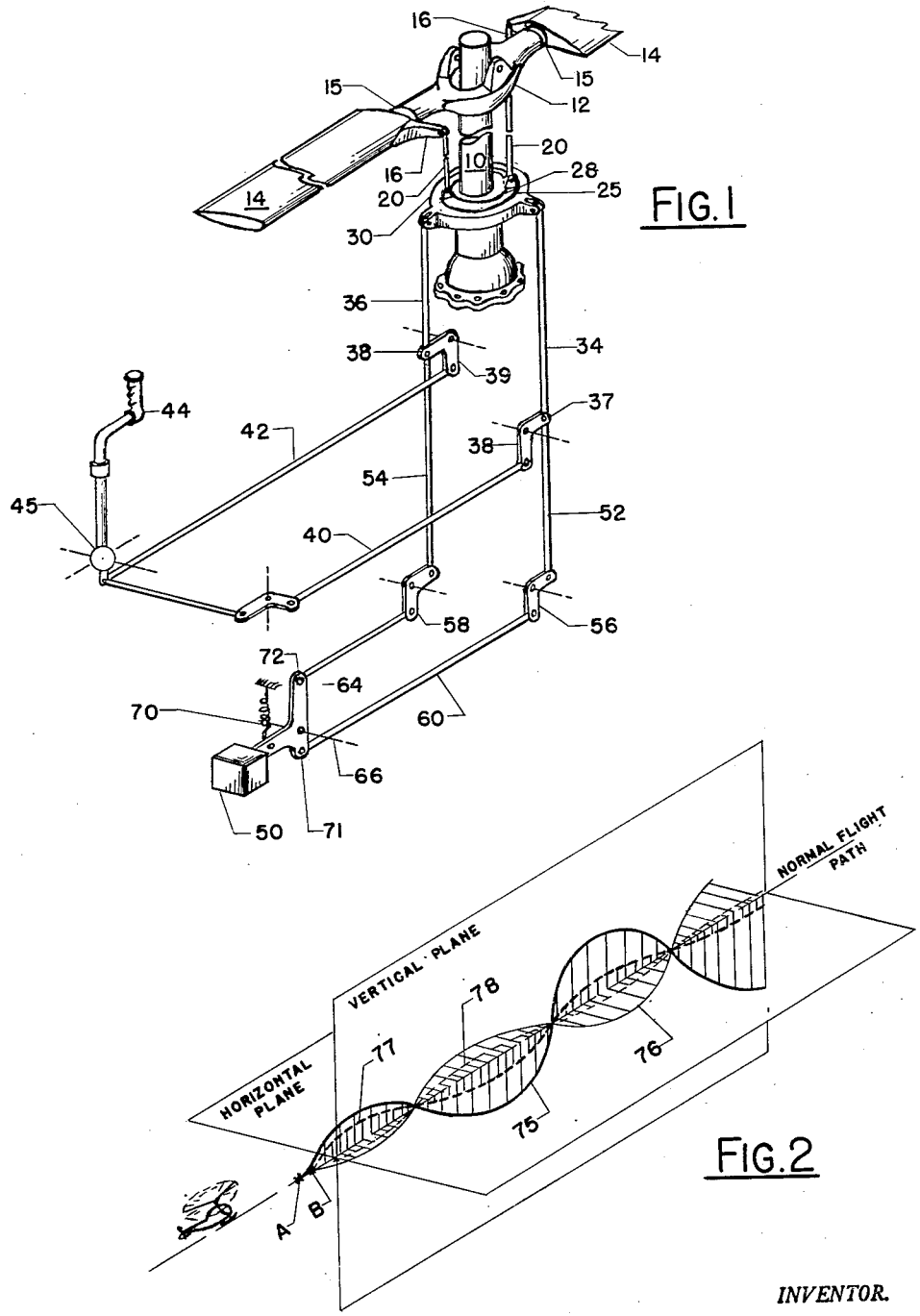
FIG. 1 is a fragmentary perspective illustration of one form of control means of the present invention as applied to a single rotor type helicopter aircraft.
FIG. 2 is a composite graphical illustration of two different types of helicopter spiral flight paths, which will be referred to hereinafter for the purpose of explaining the need for and the effect of the present invention.

The invention contemplates, broadly, provision of a vertical acceleration-responsive "pitch" sensing inertia device in the aircraft connected into the rotor blade cyclic pitch control system in such manner as to react to "pitch" accelerations thereof by introducing both fore-and-aft and lateral rotor blade pitch corrective control motions into the cyclic rotor blade pitch control system prior to development of the "roll" oscillation producing effects referred to hereinabove which would otherwise be set up by the disturbance.

Thus, whereas it is contemplated that the automatic control arrangement of the present invention will be tailored to the helicopter configuration in any given case, taking into consideration design variables such as overall center of gravity location; gross weight; basic fuselage aerodynamics, and "envelope" characteristics, occasioned for example by changes in the external or other accessory equipment, for the purposes herein the invention is shown in simplified form herein. For example, as shown in FIG. 1 the invention is employed in conjunction with a single lift rotor type helicopter having a rotor mast or drive shaft as indicated at 10 which mounts a rotor hub as indicated at 12 which in turn carries a pair of diametrically opposed rotor blades extending radially therefrom as indicated at 14. The rotor hub 12 is mounted upon the drive shaft or mast 10 for universal inclination thereon by means of any suitable device such as a gimbal ring or the like as shown in for example U.S. Patent 2,368,-698; while being at the same time keyed to the shaft 10 so as to rotate therewith in response to power applied to the drive shaft through means of the aircraft engine (not shown).

The rotor blades 14—14 are connected to the hub 12 by means of bearing devices 15 permitting the blades to be rotatable relative to the hub 12 about the long axes of the blades for blade pitch change purposes. A pitch control horn 16 extends from each of the blades into pivotal connections with corresponding push-pull rods 20—20 and the rods 20—20 are pivotally connected for cyclic pitch control of the blades to the rotating inner race portion of a swash plate device 25 which includes a ball and socket mounting 28 on the drive shaft 10, and an outer race 30.

A pair of push-pull members as indicated at 34—36 connect to the outer race 30 of the swash plate device at ninety-degree spaced positions thereon and extend downwardly into the aircraft body and then into pivotal connections as indicated at 37—38 to corresponding bell cranks 38—39 which are fulcrumed upon the fixed aircraft structure and which pivotally connect at their other ends to corresponding push-pull members 40—42. Whereas, the swash plate type device has been shown and described as being mounted on the mast 10 by means of a ball and socket type bearing, it will be understood that any other suitable mounting device permitting universal tilting thereon may be employed, such as for example, a Cardan joint or the like. The push-pull members 40—42 are connected in turn to the respectively lateral cyclic and fore-and-aft cyclic control outputs of the pilot control stick as indicated at 44; the latter being mounted as indicated at 45 for universal tilting for longitudinal pitch and lateral roll control of the aircraft by the manual pilot as is well known in the art.

In the case of the present invention the swash plate is also connected to an "automatic cyclic control system" pilot" 50, as by means of push-pulls 52—54; bell cranks 56—58; push-pulls 60—62, and a bell crank 64 which fulcrums upon the fuselage at 66. The bell crank 64 includes a horizontal arm portion 68 upon which is hung the weight 50 at a position which is either ahead or behind the overall center of gravity of the aircraft and laterally of the roll axis thereof and out of vertical alignment with the pivotal mounting 66 of the bell crank 64 on the aircraft frame. Thus, as shown in the drawing the weight 50 tends to bias the bell crank 64 to rotate in counterclockwise direction as viewed in FIG. 1 about the pivotal connection 66; but a counterbalancing spring device as indicated at 70 is also provided in connection to the bell crank to normally hold the crank and weight unit as in the position shown. A tension adjustment device may be arranged in connection with the spring so that the pilot may readily adjust the counterbalancing effect of the spring against the weight member 50. This system also operates to tend to "center" the pilot control stick and improves the "feel" of the control system, as is known in the art to be desirable.

It will be noted that the bell crank 64 is arranged to impose differential motions into the push-pull systems controlling the tilting of the swash plate 25 in fore-and-aft and lateral directions. This is accomplished by arranging the connection of the push-pull member 60 into the bell crank as at 71, at a position closer to the fulcrum 66 than the position of connection 72 of the push-pull 62 to the bell crank. Thus, vertical motions of the mass 50 about the fulcrum 66 will result in greater displacements of the system controlling fore-and-aft tilting of the swash plate 25 than are imposed upon the system controlling lateral tilting thereof. Thus, the mechanism is arranged to oppose both "pitching" and "rolling" of the aircraft, but to different degrees commensurate with the corrective influences required to maintain the helicopter in stable flight, as explained hereinabove.

Thus, it will be appreciated that in the form of FIG. 1, with the weight 50 and the spring 70 so selected and relatively adjusted as to normally balance the control linkage system in an attitude such as is illustrated in FIG. 1, any pilot actuations in either fore-and-aft or lateral directions of the pilot control stick 44, will thereupon cause the swash plate unit 25 to be correspondingly tilted on its bearing 28 relative to the fixed structure of the aircraft. In turn, such tiltings of the swash plate will actuate the rotor blade pitch control horns to produce corresponding pitch changes of the rotor blades in their bearings, cyclically as the rotor revolves about the vertical center line of the drive shaft 10. Inclusion of the mechanism of the present invention in conjunction with the conventional control system will not interfere with pilot operation of the latter for aircraft maneuvering purposes; while at all times, without attention by the pilot, the weight 50 is automatically attentive to any pitch and roll accelerations of the aircraft and will operate automatically to adjust the rotor blade cyclic pitch control system to counter such acceleration movements of the aircraft. For example, assume that the aircraft is flying forwardly in a substantially horizontal flight path, and that it is suddenly disturbed by a gust or the like and pitches upwardly. The weight 50 will lag behind the vertical "drop" or "jump" of its mounting fulcrum due to the inertia of the weight. This lagging behind of the weight will automatically cause the bell crank 64 to rotate about the pivot 66, thereby transmitting through the rods 60—62 control motions tending to tilt the swash plate 25—38.

The control system is so designed and constructed that such a control motion imparted to the swash plate control system will tilt the latter in such manner as to cause the rotor blade cyclic pitch change devices to operate to cause the rotor to pitch downwardly, thereby offsetting or countering the rising motion of the aircraft. Similarly, any disturbances causing downward pitching of the aircraft will be automatically accompanied by opposite direction pivoting of the crank arm 64, resulting in corresponding adjustments of the blade pitch control swash plate so as to counter the oscillating tendencies so induced. It is of course essential that the acceleration countering control effects of the invention be so timed as to act in the manner of damping influences against the "roll" oscillating tendencies which are normally set up by disturbances, as distinguished from being cumulative thereto. Alternatively to the single "automatic pilot" mechanism illustrated in FIG. 1, separate vertical acceleration sensors may be employed in connection with the fore-and-aft and lateral control systems, respectively to the cyclic control swash plate 25. In such case the accelerometers corresponding to the mass 50 of FIGS. 1 would be mounted in the aircraft at positions longitudinally spaced from the overall center of gravity thereof and laterally of the roll axis of the aircraft, respectively.

It will be appreciated that the spring 70 and the weight 50 of FIG. 1 will be preselected so as to be of such characteristics as to give relatively sensitive reaction to any vertical acceleration tendencies. Preferably, the action of the acceleration-responsive weight mass 50 will be damped, as for example by means of any suitable friction damping device or the like (not shown). For "collective" control of the pitch of the rotor blades of the rotor any suitable means may be employed (not shown) as is well known in the art. Also, if desired, the system may be constructed so that the stick 44 may be "locked" in any position while permitting the mass 50 to operate automatically as described hereinabove, simply by adding to the stick connecting linkage system any suitable mixing lever device as shown for example at 45 in my prior Patent 2,743,071.

FIG. 2 illustrates graphically the effect of the present invention. In this illustration, the curves designated 75—76 illustrate the vertical and horizontal components of deviations from a straight line flight path which a conventional helicopter aircraft or the like may take for example in response to a flight path disturbing gust, if the aircraft has inherently instable characteristics. Thus, as shown in FIG. 2 whenever the aircraft is disturbed by an oncoming gust or the like as at point A, the rotor is thereby tilted upwardly and is accompanied by the fuselage in assuming an upwardly pitched attitude. Immediately thereafter the craft tends to roll to the right and thus the flight path curves upwardly over to the right and laterally, and thereupon continues to oscillate with constantly increasing velocity and amplitudes above and below the horizon of and laterally to both sides of the original straight line flight path. On the other hand, as illustrated by curves 77—78, whenever a helicopter aircraft embodying the present invention is met by an oncoming gust and initially pitches upwardly, the acceleration-responsive control device of the present invention then goes into operation automatically whereby to substantially anticipate and repulse the forces normally producing oscillations in "roll" and "pitch" resulting in cumulative two-dimensional phugoidal oscillation deviations from the flight path norm.

The essential feature of the operation of the device lies in the timing of its action, which is such as to anticipate the motions of the helicopter. When the weight 50 is located forwardly or rearwardly of the aircraft center of gravity, then the fuselage pitching accelerations will affect it, causing its maximum effect to occur such as at B. This phase relationship is essential to proper operation of the device. Thus, the control mechanism of the present invention suppresses the tendency of the aircraft to oscillate in its flight path as shown by curves 75—76, and operates to damp the tendencies to oscillation both above and below and laterally of the plane and direction of the original horizontal flight path so as to ultimately result in leveling out of the flight path as indicated at the right hand end portion of the curves 77—78.

Thus, the present invention is clearly distinguished from the operation of conventional type helicopter aircraft such as are inherently instable, and which therefore tend to fly in increasingly divergently oscillating flight paths as indicated by curves 75—76 of FIG. 2. These curves illustrate how the pitch and roll oscillations of inherently instable helicopter aircraft tend to constantly increase in velocity and amplitude, and therefore require strict and expert countercontrol by the aircraft pilot in order to avoid disaster in the absence of a device of the present invention.

Whereas, the invention has been illustrated and described only in conjunction with a "Young" type rotor mechanism as disclosed for example in U.S. Patent 2,368,698; it is to be understood that the invention is applicable with equal facility to any other type helicopter rotor or rotary wing system. For example, the invention is equally applicable to helicopter aircraft wherein the rotor hub is rigidly attached to the rotor mast or drive shaft, and wherein the rotor blades are individually articulated to the rotor hub by means of hinge devices permitting flapping of the blades relative to the hub. In any case the rotor blades will be individually pitch-adjustable relative to the hub structure and arranged as explained hereinabove for cyclic as well as collective pitch control, and coupled to both the conventional pilot controls and to the vertical motion acceleration-responsive mechanism of the present invention as explained hereinabove. Thus, any tendencies of the aircraft to pitch away from the intended flight path will be automatically and instantaneously anticipated and counter by automatic operation of the acceleration responsive control mechanism of the invention.

It will be appreciated that the weight mass as illustrated at 50 (FIG. 1) may take any convenient form, and may be connected to the cyclic pitch control system in any other desired manner, such as for example by fixing it directly upon the pilot control lever provided of course it is out of vertical alignment with the mounting lever pivot, so as to be responsive to vertical accelerations of the aircraft as explained hereinabove.

Although only one form of the invention has been illustrated and described in detail hereinabove, it will be apparent to those skilled in the art that the invention is not so limited but that various changes may be made therein without departing from the spirit of the invention or the scope of the appended claims.

What is claimed is:

1. In a helicopter aircraft or the like, the combination comprising a bladed lift rotor mounted upon the aircraft, a blade pitch change mechanism for said rotor, a cyclic blade pitch control system operatively connected to said blade pitch change mechanism for adjustments thereof cyclically of the rotor rotation, pilot-operable control means, inertia means mounted on said aircraft for movement relative thereto in response to pitch accelerations of said aircraft, and means operatively connecting both said pilot-operable control means and said inertia means to said blade pitch control system for actuation thereof, said inertia means being connected to operate said blade pitch control system to develop aircraft "roll" control effects in response to pitch accelerations of the aircraft away from a flight attitude norm and said inertia means being positioned ahead of the center of gravity of the aircraft.

2. In a helicopter aircraft or the like, the combination comprising a bladed lift rotor mounted upon the aircraft, a blade pitch change mechanism for said rotor, a cyclic blade pitch control system operatively connected to said blade pitch change mechanism for adjustments thereof cyclically of the rotor rotation, pilot-operable control means, inertia means mounted on said aircraft for movement relative thereto in response to pitch accelerations of said aircraft, and means operatively connecting both said pilot-operable control means and said inertia means to said blade pitch control system for actuation thereof, said inertia means being connected to operate said blade pitch control system to simultaneously develop both aircraft "roll" and "pitch" control effects but to different degrees in response to pitch accelerations of the aircraft from a flight attitude norm, said inertia means being positioned ahead of the center of gravity of the aircraft.

3. In a helicopter aircraft or the like, the combination comprising a bladed lift rotor mounted upon the aircraft, a blade pitch change mechanism for said rotor, a cyclic blade pitch control system operatively connected to said blade pitch change mechanism for adjustments thereof cyclically of the rotor rotation, pilot-operable control means, inertia means mounted on said aircraft for movement relative thereto in response to pitch accelerations of said aircraft, and means operatively connecting both said pilot-operable control means and said inertia means to said blade pitch control system for actuation thereof, said inertia means being connected to operate said blade pitch control system to develop aircraft "roll" control effects in response to pitch accelerations of the aircraft away from a flight attitude norm, said inertia means being positioned behind the center of gravity of the aircraft.

4. In a helicopter aircraft or the like, the combination comprising a bladed lift rotor mounted upon the aircraft, a blade pitch change mechanism for said rotor, a cyclic blade pitch control system operatively connected to said blade pitch change mechanism for adjustments thereof cyclically of the rotor rotation, pilot-operable control means, inertia means mounted on said aircraft for movement relative thereto in response to pitch accelerations of said aircraft, and means operatively connecting both said pilot-operable control means and said inertia means to said blade pitch control system for actuation thereof, said inertia means being connected to operate said blade pitch control system to simultaneously develop both aircraft "roll" and "pitch" control effects but to different degrees in response to pitch accelerations of the aircraft from a flight attitude norm, said inertia means being positioned behind the center of gravity of the aircraft.

5. The combination set forth in claim 2 wherein said inertia means is positioned also in laterally spaced relation from the roll axis of the aircraft.

6. The combination set forth in claim 4 wherein said inertia means is positioned also in laterally spaced relation from the roll axis of the aircraft.

References Cited in the file of this patent

UNITED STATES PATENTS 2,743,071    Kelley _____ Apr. 24, 1956

FOREIGN PATENTS 682,509    Great Britain _____ Nov. 12, 1952